Nov. 12, 1963   A. R. SOLOMON   3,110,359
MOBILE SCAFFOLDING
Filed Feb. 5, 1962   2 Sheets-Sheet 1
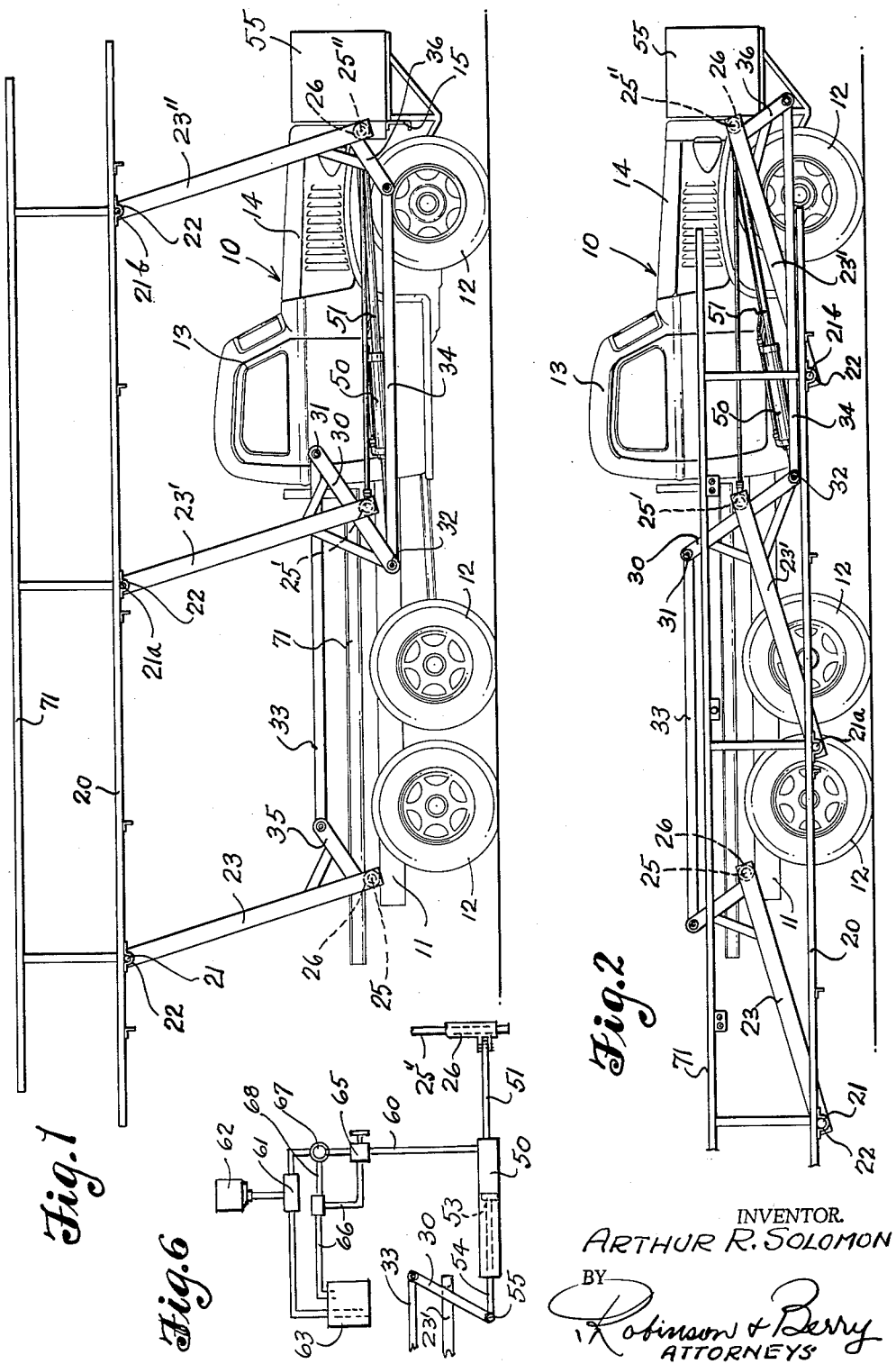
INVENTOR.
ARTHUR R. SOLOMON
BY
Robinson & Berry
ATTORNEYS Nov. 12, 1963
A. R. SOLOMON
3,110,359
MOBILE SCAFFOLDING
Filed Feb. 5, 1962
2 Sheets-Sheet 2
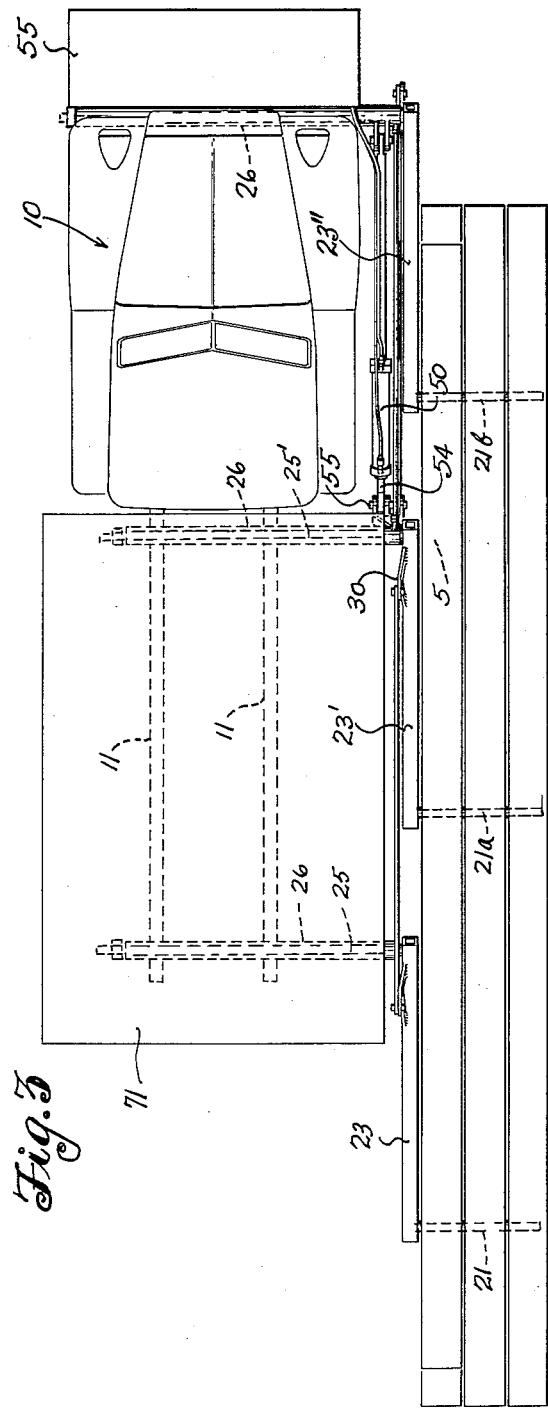
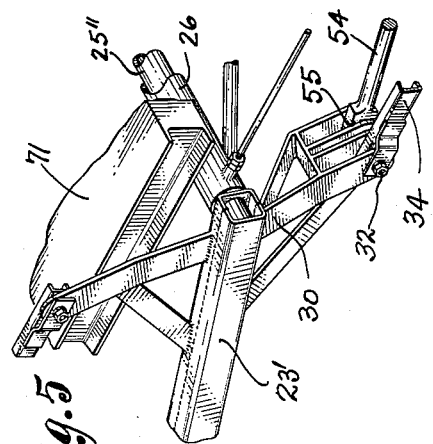
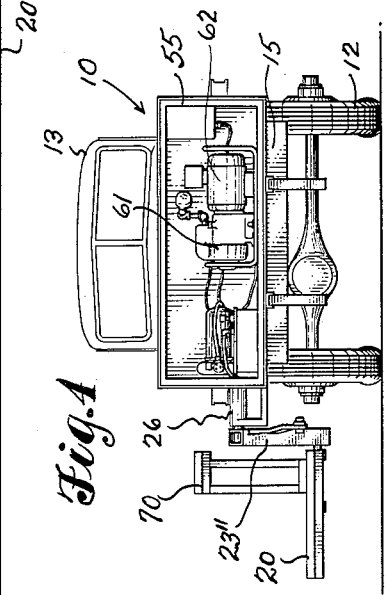
INVENTOR.
ARTHUR R. SOLOMON
BY
Robinson & Berry
ATTORNEYS United States Patent Office 3,110,359
Patented Nov. 12, 1963

3,110,359
MOBILE SCAFFOLDING
Arthur R. Solomon, 1208 N. 107th, Seattle, Wash.
Filed Feb. 5, 1962, Ser. No. 171,788
7 Claims. (Cl. 182—63)

This invention relates to scaffolding. More particularly, it relates to improvements in mobilized scaffolding or staging that is affixed to and supported for functional use by the frame structure of a vehicle such as, for example, an automobile, truck, tractor, trailer or other mobile carrier and is movable thereby from one setting to another on a job and also is adapted to be moved from one job to another without detachment from its supporting and mobilizing vehicle.

The present invention is a continuation-in-part of and an improvement on the mobilized scaffolding disclosed in United States patent application No. 86,215, filed January 31, 1961, now abandoned, and entitled Mobile Staging.

It is the principal object of this invention to provide a strong and durable scaffolding that is of light weight; that can be readily applied to the selected mobilizing and supporting vehicle without requiring any material change or alteration in the powering of or in the vehicle structure; that employs substantially fewer necessary parts in its construction than used in the scaffolding of the above identified prior patent application; that embodies as a part thereof a staging or worker's platform and can be readily adjusted to different levels between a lower and an upper limit of adjustment by power means of novel construction and mode of operation that is carried in its entirety on the vehicle.

It is a further object of the present invention to provide a scaffolding including a plurality of staging supports that are mounted transversely of, below and at spaced intervals along the staging floor or platform structure, and which staging supports are rigidly fixed to extend horizontally from the lower ends of lever arms or hangers that, in turn, are fixed at their upper ends to cross-rods that are mounted horizontally on and transversely of the chassis of the carrier vehicle, said hangers being joined for swinging adjustment in unison under influence of the power means for establishing and retaining the working level of the staging floor. Furthermore, to provide hydraulic valve controlled means on the transporting vehicle for effecting the adjustment of and for retaining the working level to which the staging is vertically adjusted.

Further objects and advantages of this invention reside in the detail of construction and combination of parts employed therein and in the mode of use and operation of the scaffolding, as will hereinafter be fully described.

In accomplishing the above mentioned and other objects of the invention, I have provided the improved details of construction, the preferred forms of which are illustrated in the accompanying drawings, wherein:

FIG. 1 is a side view of a suitable carrier vehicle to which the scaffolding of this invention has been applied and which scaffolding is there shown in an elevated or raised position.

FIG. 2 is a similar side view of the carrier vehicle, showing the scaffolding in a lowered position.

FIG. 3 is a top view of the vehicle and scaffolding, with the scaffolding in its lowered position.

FIG. 4 is a front end elevation of the vehicle with the scaffolding shown in the lowered position of FIG. 2.

FIG. 5 is a perspective view of those parts of the scaffolding shown in the dash-line circle —5— in FIG. 3.

FIG. 6 is a schematic showing of the hydraulic system employed for effecting and holding scaffolding adjustment.

Referring more in detail to the drawings:

In the present instance, the scaffolding carrier vehicle employed for support and movement of the scaffolding is a typical, present day automobile truck, designated in its entirety by reference numeral 10. This truck embodies the usual chassis and frame structure including the longitudinal, laterally spaced opposite side beams 11—11, and the usual supporting ground wheels 12. The truck also includes a cab 13, engine hood 14 and is equipped with a front bumper bar 15.

The scaffolding of this invention is here shown to comprise a horizontal, suitably constructed platform or staging 20 which is supported on three substantially equally spaced transverse shafts or rods 21—21a and 21b; these rods having their outer end portions rotatably contained in bearings 22 fixed to the under surface of the platform, as well shown in FIGS. 1 and 2. At their inner ends, these rods, respectively, are fixed rigidly to the outer end portions of hanger bars 23, 23' and 23" that have their inner ends rigidly fixed to the laterally projecting ends of supporting shafts 25, 25' and 25" that are fitted for axial rotation within tubular bearing supports 26 that are supported transversely across the opposite side beams 11—11 of the chassis of the carrier vehicle and fixed rigidly thereto by suitable means.

Fixed rigidly to the medial hanger arm 23' of the scaffolding adjusting structure closely adjacent the cross-shaft 25; as in FIGS. 1 and 2, by welding or otherwise, is a cross-arm 30 which extends substantially equally to opposite sides of the hanger arm in a vertical plane parallel to the plane in which the several hanger arms are adapted to swing. This cross-arm 30 has its opposite ends pivotally connected, as shown at 31 and 32 in FIGS. 1 and 2, to the ends of links 33 and 34 that extend, respectively, rearwardly and forwardly of and along the side of the truck and are connected at their other ends, respectively to lever arms 35 and 36 that are fixed rigidly to and extend in vertical planes, at right angles thereto but in opposite directions from the inner end portions of said hanger levers 23 and 23". These lever arms 35 and 36 are rigidly fixed to their respective levers 23 and 23" and the connections made are such as to join all levers 23, 23' and 23" in such manner that all may be swung in unison and to equal extent for effecting platform elevational adjustment.

Platform adjustment is under control of a hydraulic cylinder 50 located at the near side of the truck cab as shown in FIG. 1. This cylinder 50 has a rather elongated mounting rod 51 extending from its forward end to the extended end portion of the front end tubular bearing 25 containing the mounting rod 25" of hanger to lever 23" to which it is pivotally joined as at 51 in FIG. 3.

Contained in the hydraulic cylinder for reciprocal action is a piston 53 with a rod 54 extended rearwardly therefrom and pivotally connected at its outer end, as at 55 to the lower end portion of cross-arm 30, as at 55, in FIGS. 5 and 6. Hydraulic pressure medium may be applied to the forward end portion of the hydraulic cylinder thus to effect the rearward travel of the piston and incident swinging action of cross-arm 30 for an upward swinging actuation of hanger arms 23, 23' and 23" thus to raise the platform. The hydraulic medium employed in the cylinder 50 is supplied under pressure by a suitable pump powered by an electric motor; these parts being contained in a housing 55 supported at the front end portion of the vehicle. Application of the medium to the hydraulic cylinder and its release therefrom is under valve control as shown in the schematic illustration of FIG. 6.

In FIG. 6, it has been shown that the hydraulic cylinder 50 has a pressure medium supply pipe line 60 leading thereto from a pump 61. The pump is shown to be driven by an electric motor 62 that draws pressure medium from a storage tank 63 and deliver it under pressure through pipe 60 to cylinder 50. A four way hand operated valve 65 is interposed in pipe line 60 to control delivery of the medium to the cylinder 50 or for its return from cylinder 50 back to storage through a pipe line 66. When valve 65 is closed it operates to retain whatever pressure medium may be in the cylinder 50 for support of the platform at its adjusted elevation. While valve 65 is closed, the pump continues to operate and liquid is by-passed through pressure regulated valve 67 and pipe 68, back to storage. When the valve 65 is opened to pipe 68 from cylinder 50 pressure on the piston 53 as supplied by weight of the scaffolding acting through rod 54 forces the liquid from the cylinder 50, back to the storage tank 63 and allows a downward adjustment of the platform.

It is also shown in FIGS. 1, 2 and 3 that the platform mounts a work bench 70 and the body of the truck has a load hauling bed 71 on which construction materials may be hauled from place to place and may be easily transferred from bed 71 to platform for use by the workmen.

It is to be further explained that the arrangement of lever actuating arms 35, 30 and 36 and their connecting links 33 and 34, and the operating connection between the power cylinder 50 and cross arm 30 is such that the lever arms 23, 23' and 23'' cannot be swung upwardly to a dead center position that might interfere with platform lowering. The maximum lift of these lever arms cannot go beyond their showing in FIG. 1, and therefore the weight of the supported structure will always serve to effect automatic lowering under control of valve 65.

Detaching of the scaffolding from the vehicle is readily accomplished by the removal of the retaining nuts from the inner ends of cross shafts 25, 25' and 25''.

What I claim as new is:

1. A mobile scaffold comprising a mobile vehicle having a chassis, a scaffold supporting and elevating means mounted on said chassis, said scaffold supporting and elevating means including a plurality of parallel cross-shafts rotatably mounted in a horizontal plane transversely of and by said chassis, in spaced relationship therealong with corresponding end portions extending to one side thereof, a radially extending lever arm fixed rigidly to the extending end portion of each cross-shaft, each of said lever arms having a platform supporting member at its outer end, a platform supported jointly by said supporting members, an actuating arm secured to and extending from each lever arm adjacent its cross-shaft, links extended between and joining the free ends of said actuating arms to retain said lever arms in parallel relationship and to effect their swinging adjustment in unison, and a power cylinder mounted by said vehicle, said power cylinder including a piston rod extending therefrom and operatively connected with one of said actuating arms for effecting and controlling the platform elevational adjustment by said lever arms.

2. A combination according to claim 1 including a fluid pressure medium control system connected with said power cylinder, including a valve mechanism operable to admit pressure medium to the cylinder for elevating the platform and for its release from the cylinder for lowering the platform under weight of the platform structure.

3. A mobile scaffold according to claim 1 wherein said cross-shafts are three in number and wherein the laterally extending actuating arms of the forward and rearward lever arms, respectively, extend angularly therefrom in opposite directions, and said middle lever arm has an actuating lever arm with ends extending to opposite sides thereof, and links join the opposite ends of the middle lever arm with the ends of the front and rear actuating arms.

4. A combination according to claim 1 wherein said parallel cross-shafts are rotatably contained in tubular bearings fixed to said chassis and said cross-shafts are removable from their bearings for the detachment of said scaffolding from the chassis.

5. A mobile scaffold assembly comprising a mobile vehicle, a scaffold supporting and elevating means on said vehicle and a scaffold platform secured to said supporting and elevating means outwardly spaced from one side of said vehicle, said scaffold supporting and elevating means including a plurality of longitudinally spaced lever arms rotatably mounted on said vehicle at one side thereof and projecting outwardly therefrom, each of said lever arms including a radial arm, a mounting means on one end of each radial arm for rotatably mounting said lever arm on the vehicle, a horizontal arm integral with and extending substantially at right angles from said radial arm at the other end thereof, connecting rods interconnecting said lever arms whereby the lever arms are caused to swing in unison, an angularly extending member secured to each of said lever arms adjacent the mounting means thereof, power means on said vehicle interconnected to one of said angularly extending members for rotatably swinging said lever arms in a vertical plane and said scaffold platform being mounted on and extending between said horizontal arms.

6. A mobile scaffold assembly as in claim 5 wherein said power means includes a hydraulic cylinder having a piston rod connected to the free end of said angularly extending member.

7. A mobile scaffold assembly as in claim 5 wherein said platform is removably mounted on said horizontal arms and said lever arms are removably mounted on said vehicle along one side thereof.

References Cited in the file of this patent

UNITED STATES PATENTS

| | | |
|---|---|---|
| 1,268,607 | Pettis | June 4, 1918 |
| 2,370,887 | Soskin | Mar. 6, 1945 |
| 2,698,673 | Solomon | Jan. 4, 1955 |
| 2,790,683 | Clark | Apr. 30, 1957 |